United States Patent
Redekop

(10) Patent No.: US 6,840,854 B2
(45) Date of Patent: Jan. 11, 2005

(54) APPARATUS FOR CHOPPING AND DISCHARGING STRAW FROM A COMBINE HARVESTER

(76) Inventor: Leo Redekop, Box 178, R.R.#4, Saskatoon, Saskatchewan (CA), S7K 3J7

(*) Notice: Subject to any disclaimer, the term of this patent is extended or adjusted under 35 U.S.C. 154(b) by 0 days.

(21) Appl. No.: 10/233,714

(22) Filed: Aug. 30, 2002

(65) Prior Publication Data

US 2004/0043804 A1 Mar. 4, 2004

(51) Int. Cl.$^7$ ................................................ A01F 12/40
(52) U.S. Cl. ..................................................... 460/112
(58) Field of Search .......................... 239/605; 56/500; 460/112, 111, 44

(56) References Cited

U.S. PATENT DOCUMENTS

| | | | |
|---|---|---|---|
| 2,857,946 A | * 10/1958 | Nikikel ........................ | 241/55 |
| 3,693,335 A | 9/1972 | Mathews | |
| 4,137,923 A | 2/1979 | Druffel et al. | |
| 4,292,795 A | 10/1981 | Linn | |
| 4,592,514 A | * 6/1986 | John et al. ..................... | 241/55 |
| 4,612,941 A | * 9/1986 | Kunde ......................... | 460/112 |
| 4,637,406 A | 1/1987 | Guinn et al. | |
| 4,892,504 A | 1/1990 | Scott et al. | |
| 4,923,431 A | 5/1990 | Miller et al. | |
| 5,042,973 A | 8/1991 | Hammarstrand | |
| 5,232,405 A | 8/1993 | Redekop et al. | |
| 5,482,508 A | 1/1996 | Redekop et al. | |
| 5,833,533 A | 11/1998 | Roberg | |
| 5,928,080 A | 7/1999 | Jakobi | |
| 6,070,816 A | 6/2000 | Hirsch | |
| 6,113,491 A | 9/2000 | Holmen | |

FOREIGN PATENT DOCUMENTS

| | | | |
|---|---|---|---|
| DE | 26 12 692 | 10/1977 | |
| DE | 3615151 A1 | * 11/1987 | ........... A01F/12/40 |
| EP | 331784 A1 | * 9/1989 | ........... A01F/12/40 |
| WO | WO 00 78126 A | 12/2000 | |

* cited by examiner

*Primary Examiner*—Meredith Petravick
(74) *Attorney, Agent, or Firm*—Adrian D. Battison; Michael R. Williams; Ryan W. Dupuis

(57) ABSTRACT

A chopper and discharge apparatus includes a stationary housing for attachment to the rear discharge of a combine harvester so that straw is fed from the combine into an inlet of the housing and is discharged from an outlet of the housing. Within the housing is mounted a hub for rotation about the horizontal axis with the hub carrying a plurality of lugs at angularly and axially spaced positions therearound, each lug carrying a pair of pivotal blade members which are rotated with the hub in the form of flails. Each lug is associated with a stationary blade on the inside of the housing so that the pair of blades carried on each lug sweep past the stationary blade each on a respective side of the stationary blade. The blade members include some flat cutting blades in a center section and only fan blades in end fan sections.

35 Claims, 2 Drawing Sheets

US 6,840,854 B2

APPARATUS FOR CHOPPING AND DISCHARGING STRAW FROM A COMBINE HARVESTER

This invention relates to an apparatus for chopping and discharging straw from a combine harvester of the type which includes a plurality of blade members mounted on a hub for rotation about an axis of the hub with the blade members being arranged at spaced positions along the length of the hub substantially in radial planes of the hub so as to pass adjacent a plurality of axially spaced stationary blades again arranged in radial planes of the hub. The straw and other material discharged from the combine is fed into one side of the housing of the apparatus onto the hub and the material is carried around by the hub past the stationary blades in a chopping action. The material is then discharged from a discharge opening in the housing for collection or spreading across the field.

BACKGROUND OF THE INVENTION

The present invention is particularly a modification of or an improvement over the arrangements disclosed in U.S. Pat. No. 5,232,405 issued Aug. 3, 1993 and U.S. Pat. No. 5,482,508 issued Jan. 6$^{th}$, 1996 of the present inventors, the disclosures of which are incorporated herein by reference.

These arrangements show blades which include a support plate lying in a radial plane and an additional plate or flap at right angles to the support plate so that the additional plate lies longitudinally of the hub. The additional plate is in most cases inclined so that a radially outer edge of the additional plate lies angularly forwardly of a radially inner edge of the plate. The additional plate is welded across a trailing edge of the support plate and extends out to both sides of the support plate.

These arrangements have achieved considerable commercial and technical success and the present invention is directed to a yet further improvement which builds upon the improvement of the previous patent.

A further arrangement relevant to the present invention is that shown in U.S. Pat. No. 5,042,973 of Hammarstrand which discloses a similar chopping and discharge apparatus having rotating blade members carried on a hub and stationary blades fixed to the housing. The blade members are mounted in pairs so that a single lug carried on the hub supports a transverse pin parallel to the axis of the hub with the blade members mounted on respective sides of the lug and carried on bushings mounted on the pin. The blade members are spaced so that each blade member passes between two of the stationary blades in a cutting action. The blade members are shaped so as to be arch shaped in each cross section transverse to the length of the blade member thus defining a sharpened cutting edge at the leading edge and a sharpened cutting edge at the trailing edge with a center section of the blade bowed outwardly of a plane containing the leading and trailing edges. The blades are shown in face to face or back to back arrangements of the pairs.

A yet further arrangement is shown in U.S. Pat. No. 3,693,335 (Mathews) which shows blades which are inclined from the normal radial plane so as to extend outwardly from the hub in a direction which is inclined to the radial and axial directions.

A yet further arrangement is disclosed in U.S. Pat. No. 4,292,795 (Linn) issued Oct. 6$^{th}$, 1981 and U.S. Pat. No. 4,892,504 (Scott) issued Jan. 9$^{th}$, 1990 both of which show a straw spreader which includes a horizontal fan assembly with two types of blades which rotate about parallel vertical axes on top of a base plate and generate a suction effect tending to draw the straw downwardly into the top of the fan assembly and to expel the straw rearwardly from the back of the base plate.

In the above U.S. Pat. No. 5,482,508 of the present inventors, the blades are arranged with some flat blades and some bent fan blades so as to generate an air flow across the full width of the cutting assembly. Attempts have been made to modify the arrangement of the flat cutting blades relative to the fan blades so that there are more fan blades adjacent the ends of the cutting assembly so as to increase air flow at the ends where the larger air flow is required to effect spreading of the material from the ends of the cutting assembly. However this action of increasing the number of fan blades at the ends has not allowed the arrangement to provide an effective cutting action to provide the shortest straw which can be achieved using solely flat blades.

One attempt to improve air flow is that shown in U.S. Pat. No. 6,113,491 issued Sep. 5$^{th}$, 2000 by Holmen which discloses a cutting assembly having conventional flat blades with a fan arranged at one end of the cutting assembly and arranged to drive the air inwardly and into an opening in the housing so that the air is released along the length of the cutting assembly at the flat cutting blades to assist in driving the air and the material out of the cutting assembly. This arrangement has not achieved significant commercial success.

Another attempt to improve air flow is that shown in U.S. Pat. No. 4,637,406 issued Jan. 20$^{th}$, 1987 by Guinn in which Hesston discloses a cutting assembly which includes fan blades within the rotor assembly attempting to drive air through the rotor and out with the cut material.

In U.S. Pat. No. 6,070,816 issued Jun. 6$^{th}$, 2000 by Hirsch, Deere discloses an arrangement in which there is provided two vertical rotors side by side, each having internal additional fan blades within the rotor which assist in discharging the material.

In U.S. Pat. No. 5,833,533 issued Sep. 17$^{th}$, 1996 by Roberg, Claas discloses a further arrangement in which a conventional horizontally mounted chopping rotor is supplemented by two fan members lying underneath the discharge of the rotor.

Both of these arrangements are very complicated and significantly increase the cost of the construction.

In U.S. Pat. No. 4,923,431 (Miller) issued May 8$^{th}$, 1990 and U.S. Pat. No. 4,137,923 (Druffel) issued Feb. 6$^{th}$, 1979 are disclosed arrangements in which chaff is spread using fans arranged at the ends of the chaff discharge so that each fan is directed to blow the material out to the side of the combine harvester.

In many cases, an improved spreading action is required requiring the use of fan blades or flails as disclosed in the above patents of Redekop. However these arrangements require relatively wide spacing between the stationary blades due to the increased width of the flails or fan blades. A further requirement in some cases is therefore that the length of the chopped pieces be reduced as far as possible. These two requirements of providing increased air flow and providing minimum cutting length are therefore contrary requirements and up until now the only arrangements available to carry out this minimum cutting length and sufficient spreading action are the complicated arrangements provided by Deere or Claas and set forth above in which additional spreading action is provided to supplement the weak spreading action provided by the narrow cutting blades.

SUMMARY OF THE INVENTION

It is one object of the present invention to provide an improved chopper and discharge apparatus of the same general type as shown in the above patents of the present inventor which provides an improved cutting action while generating sufficient spreading action to meet spreading requirements.

According to one aspect of the invention there is provided a chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes the blade members to pass generally between the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

the chopping assembly comprising a center chopping section and two end fan sections;

the blade members in the center chopping section and the two end fan sections being arranged such that an air flow generated thereby is driven radially outwardly by the blade members so as to exit from the housing radially outwardly from the blade members through the discharge opening;

the blade members in the center chopping section being substantially all flat blade members each of which is defined substantially by a planar cutting portion lying in a radial plane of the hub axis;

the blade members in each of the fan sections being substantially all fan blade members each of which each includes a fan blade portion arranged to extend outwardly to at least one axial side of the radial plane so as to generate an increased air flow relative to said flat blade members.

Preferably in the center section between the fan sections all the blade members are flat, although a limited number may have a fan blade portion; but the intention is that the blades in the center section have a maximised cutting action and a minimised fan action. The blades may not be wholly flat but are preferably flat since these generate a minimum width or thickness allowing a minimum spacing between the stationary blades. In some cases blades which are arched in transverse cross-section may be used. In some cases blades which have a kink or bend in their length may be used.

Preferably in the fan sections all the blade members are fan blade members and there are no flat blade members. This again maximises the fan effect and avoids the use of unnecessary or interfering cutting blades in the fan section, but in some cases some of the blades in the fan section may be cutting blades to provide some cutting action in this section.

Preferably the chopping assembly and the blade members thereon are arranged such that air can communicate axially from the fan sections to the center section to supplement radial air flow therein, that is there is no shield or housing section which interfered with the free transfer of air from the fan section into the center section so that the fan section can assist in generating radial air flow in the center section while the blades in the center section can be shaped for maximum cutting action.

Preferably fan blade members are shaped such that the fan blade portion thereof is inclined such that a radially outer part of the fan blade portion is arranged angularly advanced of a radially inner part of the fan blade portion. This, as shown in the prior patents of the present inventor provides an improved fan effect.

Preferably the fan blade members in the fan sections are arranged all in a row one behind next. This is preferably a single row. This reduces the width of the fan section so that the center cutting section can be maximised, while providing maximum fan effect.

Preferably in the center section the flat blade members are arranged such that the blade members are angularly and axially offset.

Preferably spacing between stationary blades at the center section is too narrow to allow passage therebetween of a fan blade. That is the spacing is selected for use with only the narrow width cutting blades to provide minimum spacing between the stationary blades and thus shortest possible straw length.

Preferably each fan blade member has an area of the fan blade portion thereof which is greater than 2.0 square inches and is preferably greater than 4.0 square inches and is preferably of the order of 6.0 square inches. This provides a high fan effect in minimum area.

Preferably in each fan section the total area of the fan lade portions of the fan blade members is greater than 12.0 square inches, preferably greater than 24.0 square inches and is preferably of the order of 36.0 square inches.

Preferably the fan blade members in each of the fan sections are arranged such that the velocity of air exiting radially from the discharge opening at the respective fan section is greater than 75 ft/s and preferably of the order of 125 ft/s. Of course the air exiting the center section is at much lower velocity, and at the center it can be as low as 30 ft/s. However surprisingly it has been found that the fan sections increase the air flow at the outer parts of the center section sufficiently to allow effective spreading while allowing the center section to be dedicated to cutting and thus allow a shorter cutting length.

Preferably the housing at the inlet opening includes a cover over the fan blade members to prevent direct feeding of crop material onto the fan blade members. This is not essential but the intention is that the fan sections have no cutting action to maximise the fan effect so that it is better to reduce the amount of material fed into this section, although some can enter from the center section since there is no barrier therebetween.

Thus preferably the fan sections have no stationary blades arranged for co-operation with the fan blade members.

Preferably the fan blade members are arranged at a reduced angular spacing relative to the flat blade members thus increasing the amount of fan blades for maximum fan effect.

Preferably the flat blade members are arranged in pairs with each one of a pair being arranged on a respective side of one of the stationary blades.

Preferably each pair is mounted on a respective one of a plurality of lugs mounted on the hub member at spaced positions thereon, each lug having a pin mounted thereon with a pin axis of the pin parallel to the axis of the hub member such that the pair of flat blade members can pivot on the pin about the pin axis.

Conveniently the fan blade members can be mounted one behind the next on a single radial disk carried on the hub.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
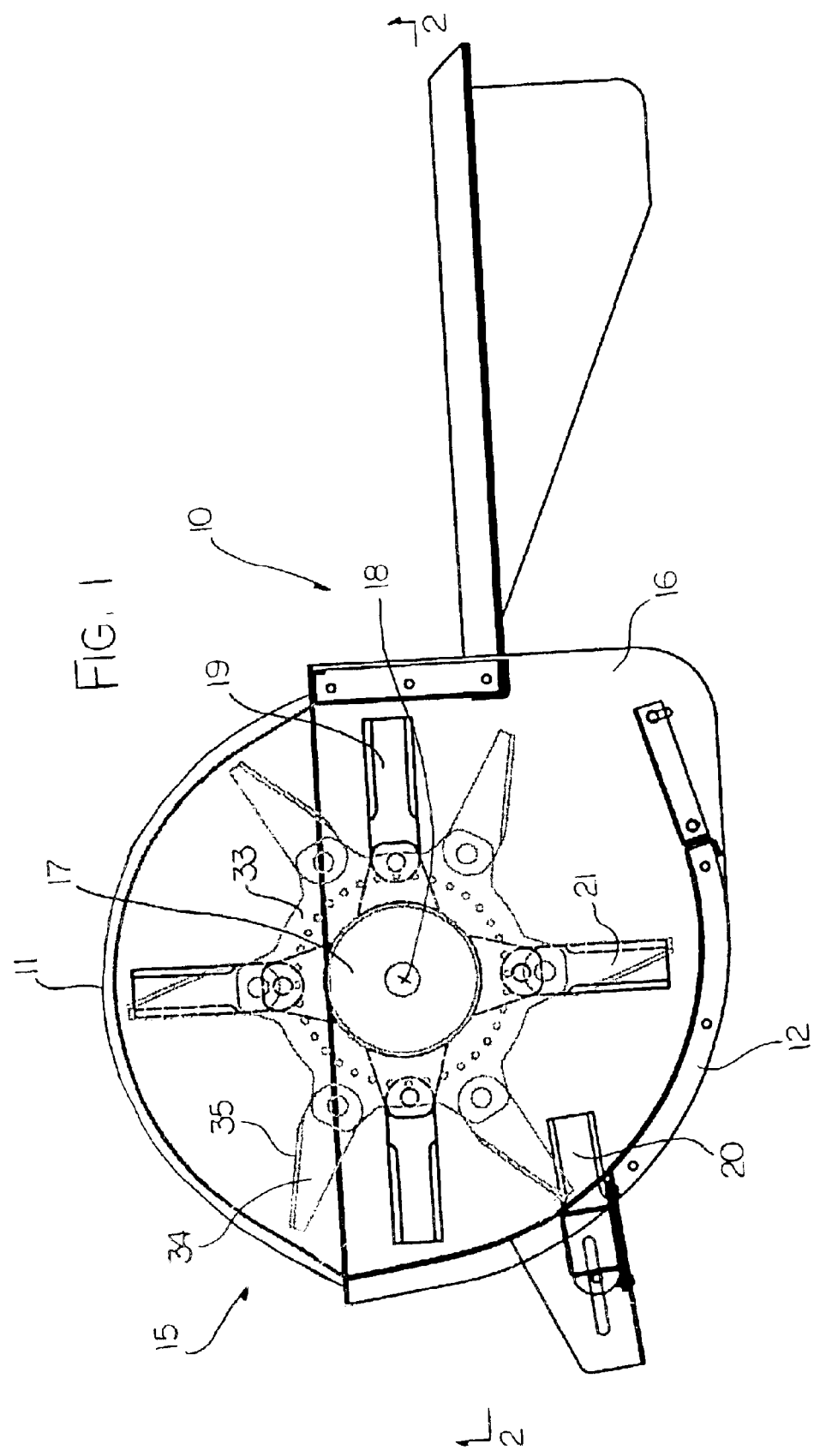
FIG. 1 is a vertical cross sectional view through a chopper and distribution apparatus according to the present invention.

The chopper and discharge arrangement shown in FIG. 1 is very similar to that from the above prior patents of the present inventor which are U.S. Pat. Nos. 5,232,405 and 5,482,508 the disclosures of which is incorporated herein by reference.

The apparatus therefore comprises a housing 10 defined by a top wall 11, a bottom wall 12 and two end walls 13. The end walls 13 include attachment means schematically for attachment of the housing to the outlet of a combine harvester for discharge of straw and possibly chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field or for transportation into a container.

Within the housing is mounted a hub 17 which is carried on suitable bearings (not shown) for rotation about a hub axis 18 at a center of the housing so that blade members 19 carried by the hub sweep around within the housing to entrap straw fed through the inlet 15 and to carry the straw and air past stationary blades 20 for chopping and for discharge through the outlet 16. The stationary blades 20 are mounted on the housing at a position approximately midway between the inlet 15 and the outlet 16 so that the blade members 19 sweep between the stationary blades in a cutting action.

The hub 17 carries a plurality of lugs 21 at angularly and axially spaced positions therealong with each lug mounting a pair of blade members as described in more detail hereinafter for pivotal movement of the blade members about a pin 22 parallel to the axis 18.

Figure 2:
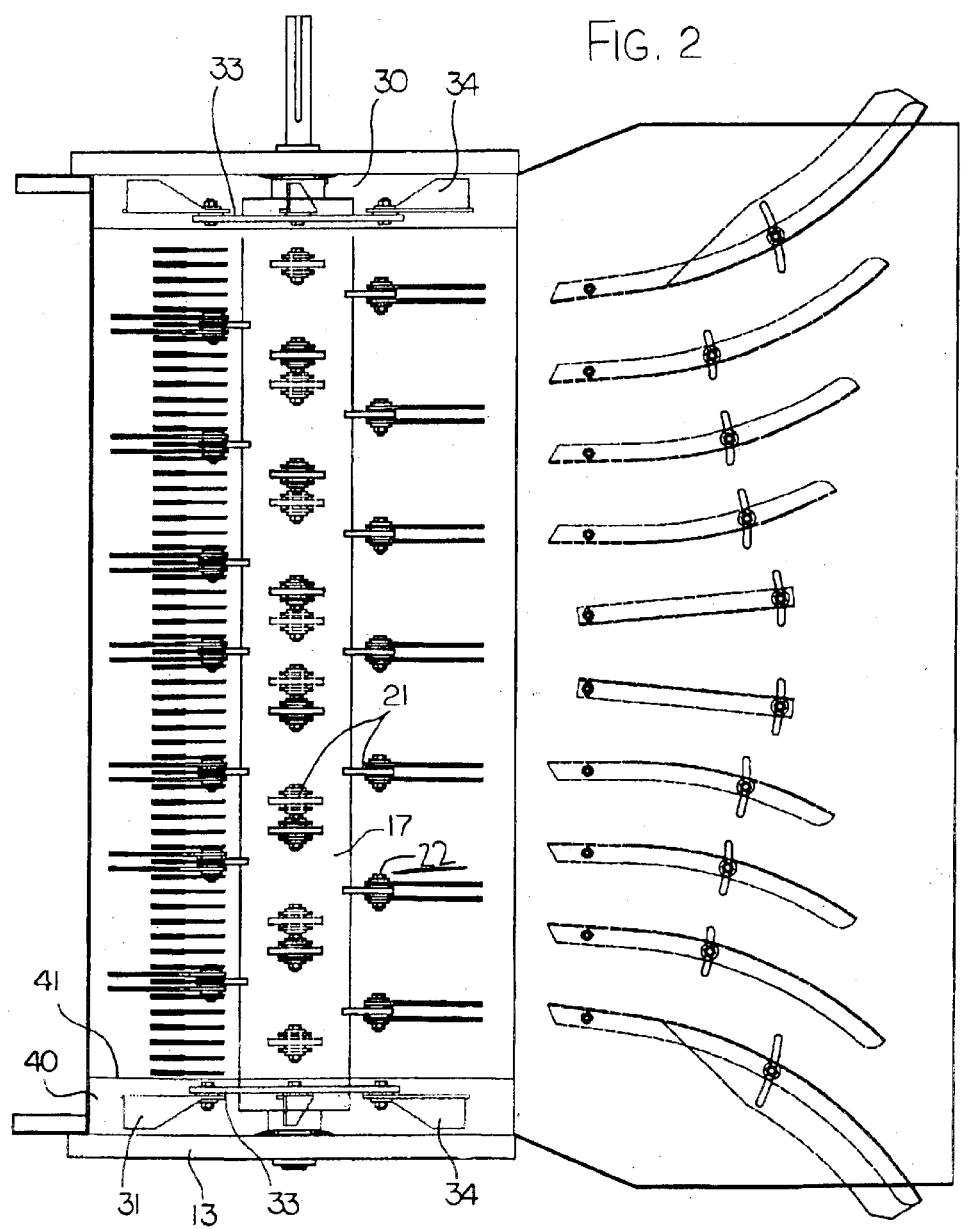
FIG. 2 is a cross sectional view along the lines 2—2 of FIG. 1.

From FIG. 2 it will be noted that the lugs 21 are arranged in a spiral pattern around the hub 17. Each of the lugs carries a pair of blade members. Each lug is aligned with a respective one of the stationary blades 20 so that each stationary blade has associated with it a respective one of the lugs and thus has associated with it the pair of blades carried by that lug. Each stationary blade is thus swept by the blade members once for each rotation of the hub with some of the stationary blades being swept at each of the four 90° positions of rotation of the hub.

In this arrangement of the chopper, there is provided three sections of the chopper assembly including a first fan section 30 at one end of the hub 17 and the second fan section 31 at the other end of the hub 17. In-between the two narrow fan sections is defined a center section which provides the whole of the cutting action.

Within the center section all or substantially all of the blades are formed of simply a flat blade lying in a radial plane of the axis 18. The blades are of the conventional flat blade type with a leading a trailing chamfered edge as best shown in FIG. 1. Thus each of the two flail blades 21 in the center section can pass closely on either side of a respective one of the stationary blades. Thus the stationary blades can be spaced as shown in FIG. 2 by a distance which is just sufficient to allow the passage there between of a flat cutting blade 21. The spacing between the stationary blades is thus significantly reduced relative to the previous arrangements of Redekop in that the stationary blades are not sufficiently spaced to allow the passage there between of a fan type blade of the arrangements previously shown in the above Redekop patents.

In the fan sections 30 and 31, there is provided a ring 33 which is mounted on the hub 17 at a respective end of the hub. The ring thus surrounds the cylindrical wall of the hub and stands outwardly therefrom just beyond the end of the center section defined by the stationary blades and the blades 21 carried on the hub.

The rings 33 each carry a plurality of fan blades 34 at spaced positions around the ring. The fan blades 34 are arranged thus so that each follow directly behind the next at the same axial location and there is no staggering of the fan blades 34. There are six such fan blades as shown in FIG. 1 so that the spacing between them angularly of the hub is reduced relative to the 90 degree spacing of the stationary blades.

Each of the fan blades 34 is bent with a fan blade portion 35 so that each of the fan blades is of the shape shown in FIG. 3 of the U.S. Pat. No. 5,482,508 of the present inventor. However the fan blades 34 do not necessarily have a sharp and leading edge since there is intended to be no cutting action in the fan section. Thus the fan blades are spaced from the end most stationary blade so that in effect no cutting action occurs in this section.

As described in detail and shown in FIG. 3 of the above patent, the bent fan blade portion stands outwardly to one side of the flat plate portion of the fan blade. The fan blade portion which is bent at right angles to the main body of the fan blade is maximised in dimension so that it may be rectangular having a length of the order of 4.0 inches and a width of the order of 1.5 inches. This is significantly greater in dimension than the blades of the conventional construction of the previous Redekop patent where the fan blade portion may have a length of the order of 2.0 inches and a width of the order of 1.0 inch. Thus the fan blades of the present invention have a significantly increased surface area certainly greater than 2.0 square inches and preferable greater than 4.0 square inches and in most cases as much as 6.0 square inches. This large blade area together with the presence of the six blades provides a total fan blade area of 36 square inches which generates a significant air flow much greater than the fan blades of the previous Redekop patents. In fact surprisingly the air flow has been measured at the exit at a rate of the order of 120 to 125 ft/s which is significantly greater than the conventional air flow velocity which is generally less than 75 ft/s.

There is no baffle or other elements within the housing or on the chopper assembly to prevent air flow or material flow axially between the center section and the fan sections. The mounting ring 33 is only slightly greater in dimension than the hub so that it does not significantly interfere with the air flow between the hub and the housing since the majority of the air flow is around the outside of the housing where the fan blades are at their most effective.

As previously described the fan blade portion is inclined forwardly and outwardly so that at a regularly outer position toward the outer end of each fan blade the fan blade portion is angularly advanced relative to its position closer to the axis of the hub. This incline outwardly and forwardly significantly increases the air flow effect driving the air in the greater volume and at higher speed radially from the fan section and outwardly of the exit 16.

Preferably the fan section comprises only a single row of the six fan blades but in some cases an additional row or rows may be provided although this is not preferred. The fan blades are arranged immediately adjacent the end walls 13 so that they take up minimum space at the end of the chopper assembly. It will be appreciated that the intention is to provide maximum air flow in the fan sections while taking up minimum dimensions so that the maximised chopping effect to provide shortest material is achieved within the center section using the flat blades.

Just at the fan section, the housing provides a cover wall 40 which is a semi-cylindrical narrow wall having an inner edge 41 at the intersection between the center section and the fan section and an outer edge abutting or attached to the outer wall 13. This cover panel thus reduces the amount of feed material which enters the fan section although of course this is not precluded in view of the fact that the material can flow axially from a position at the flat blades into the fan section due to the tendency for the fan section to draw air axially outwardly at the inlet and to drive air axially inwardly at the outlet.

In operation it has been found surprisingly that the very high velocity of air from the fan section exiting radially outwardly from the exit discharge 16 occurs not only at the fan section but also extends partly into the width of the center section so that approximately 12 to 15 inches of the center section has a velocity at the exit which can be greater than 75 ft/s. Only at the very center of the center section does the velocity drop to a level less than 60 ft/s which can be as low as 30 ft/s. However this area of relatively low velocity is not problematic since the material is intended to be discharged rearwardly at the center section and the maximum velocity is required at the sides.

The present arrangement therefore provides not only the very short chopping action which is a highly desirable but also surprisingly provides a high velocity across sufficiently of the width of the cutting or chopping assembly to allow the materials at the ends of the chopper assembly to be properly spread. The separation of the fan blade section at the end of the rotor so that it is in effect entirely separate from the chopping blade action surprisingly does not interfere with the ability of the air to carry the cut crop so that a satisfactory spreading action is still obtained.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising:

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally radially outwardly from the hub member substantially in a radial plane of said axis;

the blade members being arranged at spaced positions along the length of the hub member such that rotation of the hub member causes radially extending side edges of at least some of the blade members to pass adjacent radially extending side edges of respective ones of the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

the chopping assembly comprising a center chopping section and two end fan sections;

the blade members in the two end fan sections being shaped and arranged such that an air flow is generated thereby from air drawn radially inwardly which is driven radially outwardly by the blade members so as to exit from the housing radially outwardly from the blade members through the discharge opening;

the blade members in the center chopping section being substantially all flat blade members each of which is defined substantially by a planar cutting portion lying in a radial plane of the hub axis;

the blade members in each of the fan sections being substantially all fan blade members each of which includes a fan blade portion arranged to extend outwardly to at least one axial side of the radial plane so as to generate an increased air flow relative to said flat blade members;

the blade members of the fan sections being axially spaced from the blade members of the center chopping section such that the fan sections are axially separate from the center section.

2. The apparatus according to claim 1 wherein in the center section between the fan sections all the blade members are flat.

3. The apparatus according to claim 1 wherein in the fan sections all the blade members are fan blade members and there are no flat blade members.

4. The apparatus according to claim 1 wherein the chopping assembly and the blade members thereon are arranged such that air can communicate axially from the fan sections to the center section to supplement radial air flow therein.

5. The apparatus according to claim 1 wherein the fan blade members are shaped such that the fan blade portion thereof is inclined such that a radially outer part of the fan blade portion is arranged angularly advanced of a radially inner part of the fan blade portion.

6. The apparatus according to claim 1 wherein the fan blade members in the fan sections are arranged all in a row one behind next.

7. The apparatus according to claim 1 wherein there is a single row.

8. The apparatus according to claim 1 wherein in the center section the flat blade members are arranged such that the blade members are angularly and axially offset.

9. The apparatus according to claim 1 wherein spacing between stationary blades at the center section is too narrow to allow passage therebetween of a fan blade.

10. The apparatus according to claim 1 wherein each fan blade member has an area of the fan blade portion thereof which is greater than 2.0 square inches.

11. The apparatus according to claim 1 wherein in each fan section the total area of the fan blade portions of the fan blade members is greater than 12.0 square inches.

12. The apparatus according to claim 1 wherein the fan blade members in each of the fan sections are arranged such that the velocity of air exiting radially from the discharge opening at the respective fan section is greater than 75 ft/s.

13. The apparatus according to claim 1 wherein the housing at the inlet opening includes a cover over the fan blade members to prevent direct feeding of crop material onto the fan blade members.

14. The apparatus according to claim 1 wherein the fan sections have no stationary blades arranged for co-operation with the fan blade members.

15. The apparatus according to claim 1 wherein the fan blade members are arranged at a reduced angular spacing relative to the flat blade members.

16. The apparatus according to claim 1 wherein the flat blade members are arranged in pairs with each one of a pair being arranged on a respective side of one of the stationary blades.

17. The apparatus according to claim 16 wherein each pair is mounted on a respective one of a plurality of lugs mounted on the hub member at spaced positions thereon, each lug having a pin mounted thereon with a pin axis of the pin parallel to the axis of the hub member such that the pair of flat blade members can pivot on the pin about the pin axis.

18. The apparatus according to claim 1 wherein the fan blade members are mounted one behind the next on a single radial disk carried on the hub.

19. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally radially outwardly from the hub member substantially in a radial plane of said axis, the blade members being arranged at spaced positions along the length of the hub member such that rotation of the hub member causes radially extending side edges of at least some of the blade members to pass adjacent radially extending side edges of respective ones of the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

the chopping assembly comprising a center chopping section and two end fan sections;

the feed opening being arranged to allow air to be drawn from the feed opening onto both the center chopping section and the end fan sections of the chopping assembly in a direction generally inwardly toward the axis and the discharge opening being arranged to allow discharge of the air and material generally radially outwardly from the chopping assembly;

the blade members in the center chopping section and the two end fan sections being arranged such that an air flow generated thereby from air drawn radially inwardly from the feed opening is driven radially outwardly by the blade members so as to exit from the housing radially outwardly from the blade members through the discharge opening;

the blade members in the center chopping section being substantially all flat blade members each of which is defined substantially by a planar cutting portion lying in a radial plane of the hub axis;

the blade members in each of the fan sections being substantially all fan blade members each of which includes a fan blade portion arranged to extend outwardly to at least one axial side of the radial plane so as to generate an increased air flow relative to said flat blade members;

the blade members of the fan sections being axially spaced from the blade members of the center chopping section such that the fan sections are axially separate from the center section.

20. The apparatus according to claim 19 wherein the chopping assembly and the blade members thereon are arranged such that air can communicate axially from the fan sections to the center section to supplement radial air flow therein.

21. The apparatus according to claim 19 wherein the fan blade members are shaped such that the fan blade portion thereof is inclined such that a radially outer part of the fan blade portion is arranged angularly advanced of a radially inner part of the fan blade portion.

22. The apparatus according to claim 19 wherein the fan blade members in the fan sections are arranged all in a row one behind next.

23. The apparatus according to claim 19 wherein the housing at the inlet opening includes a cover member over the fan blade members.

24. The apparatus according to claim 19 wherein the fan blade members are mounted one behind the next on a single radial disk carried on the hub.

25. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a pair of end walls and a bottom wall defining a feed opening and a discharge opening, the end walls being arranged to be mounted at the side walls of the rear discharge area of the combine harvester so that the feed opening of the housing receives straw therefrom;

a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally radially outwardly from the hub member substantially in a radial plane of said axis, the blade members being arranged at spaced positions along the length of the hub member such that rotation of the hub member causes radially extending side edges of at least some of the blade members to pass adjacent radially extending side edges of respective ones of the stationary blades in a cutting action;

the chopping assembly being aligned with the inlet opening into the housing so as to receive straw therefrom;

the feed opening being arranged to deposit the material onto the chopping assembly in a direction generally inwardly toward the axis and the discharge opening being arranged to allow discharge of the material generally radially outwardly from the chopping assembly;

the chopping assembly comprising a center chopping section and two end fan sections;

the blade members in the two end fan sections being shaped and arranged such that an air flow is generated thereby from air drawn radially inwardly which is driven radially outwardly by the blade members so as to exit from the housing radially outwardly from the blade members through the discharge opening;

the blade members in the center chopping section being substantially all flat blade members each of which is defined substantially by a planar cutting portion lying in a radial plane of the hub axis;

the blade members in each of the fan sections being substantially all fan blade members each of which includes a fan blade portion arranged to extend outwardly to at least one axial side of the radial plane so as to generate an increased air flow relative to said flat blade members;

the blade members of the fan sections being axially spaced from the blade members of the center chopping section such that the fan sections are axially separate from the center section;

and a pair of cover members located at the inlet opening and arranged to shroud over some of the blade members of the chopping assembly;

each cover member being generally coaxial to the hub member and adjacent an outer edge of the blade members;

and each cover member being located inwardly of and adjacent a respective one of the end walls and extending over only a part of the axial length of the chopping assembly.

26. The apparatus according to claim 25 wherein each cover member is part cylindrical.

27. The apparatus according to claim 25 wherein the chopping assembly and the blade members thereon are arranged such that air can communicate axially from the fan sections to the center section to supplement radial air flow therein.

28. The apparatus according to claim 25 wherein the fan blade members are shaped such that the fan blade portion thereof is inclined such that a radially outer part of the fan blade portion is arranged angularly advanced of a radially inner part of the fan blade portion.

29. The apparatus according to claim 25 wherein the fan blade members in the fan sections are arranged all in a row one behind next.

30. The apparatus according to claim 25 wherein the fan blade members are mounted one behind the next on a single radial disk carried on the hub.

31. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a pair of end walls and a bottom wall defining a feed opening and a discharge opening, the end walls being arranged to be mounted at the side walls of the rear discharge area of the combine harvester so that the feed opening of the housing receives straw therefrom;

a plurality of stationary blades mounted on the bottom wall of the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally radially outwardly from the hub member substantially in a radial plane of said axis; the hub member extending between the end walls of the housing and the blade members being arranged at spaced positions along the length of the hub member such that rotation of the hub member causes radially extending side edges of at least some of the blade members to pass adjacent radially extending side edges of respective ones of the stationary blades in a cutting action;

the feed opening being arranged to deposit the material between the end walls of the housing onto the blade members of the chopping assembly in a direction generally inwardly toward the axis and the discharge opening being arranged to allow discharge of the material generally radially outwardly from the chopping assembly;

the blade members including some fan blade members shaped and arranged such that an air flow is generated thereby from air drawn radially inwardly which is driven radially outwardly by the blade members so as to exit from the housing radially outwardly from the blade members through the discharge opening;

the blade members including some flat blade members each of which is defined substantially by a planar cutting portion lying in a radial plane of the hub axis;

and a pair of cover members located at the inlet opening and arranged to shroud over some of the blade members of the chopping assembly;

each cover member being generally coaxial to the hub member and adjacent an outer edge or the blade members;

and each cover member being located inwardly of and adjacent a respective one of the end walls and extend ing over only a part of the axial length of the chopping assembly.

32. The apparatus according to claim 31 wherein the fan blade members are shaped such that the fan blade portion thereof is inclined such that a radially outer part of the fan blade portion is arranged angularly advanced of a radially inner part of the fan blade portion.

33. The apparatus according to claim 31 wherein each cover member is part cylindrical.

34. The apparatus according to claim 31 wherein each cover member extends from the discharge opening substantially completely around that part of the periphery of the blade members which is exposed in the inlet opening above the bottom wall.

35. The apparatus according to claim 31 wherein those blade members which are covered by each of the cover members are mainly fan blade members.

* * * * *